Figure 1:
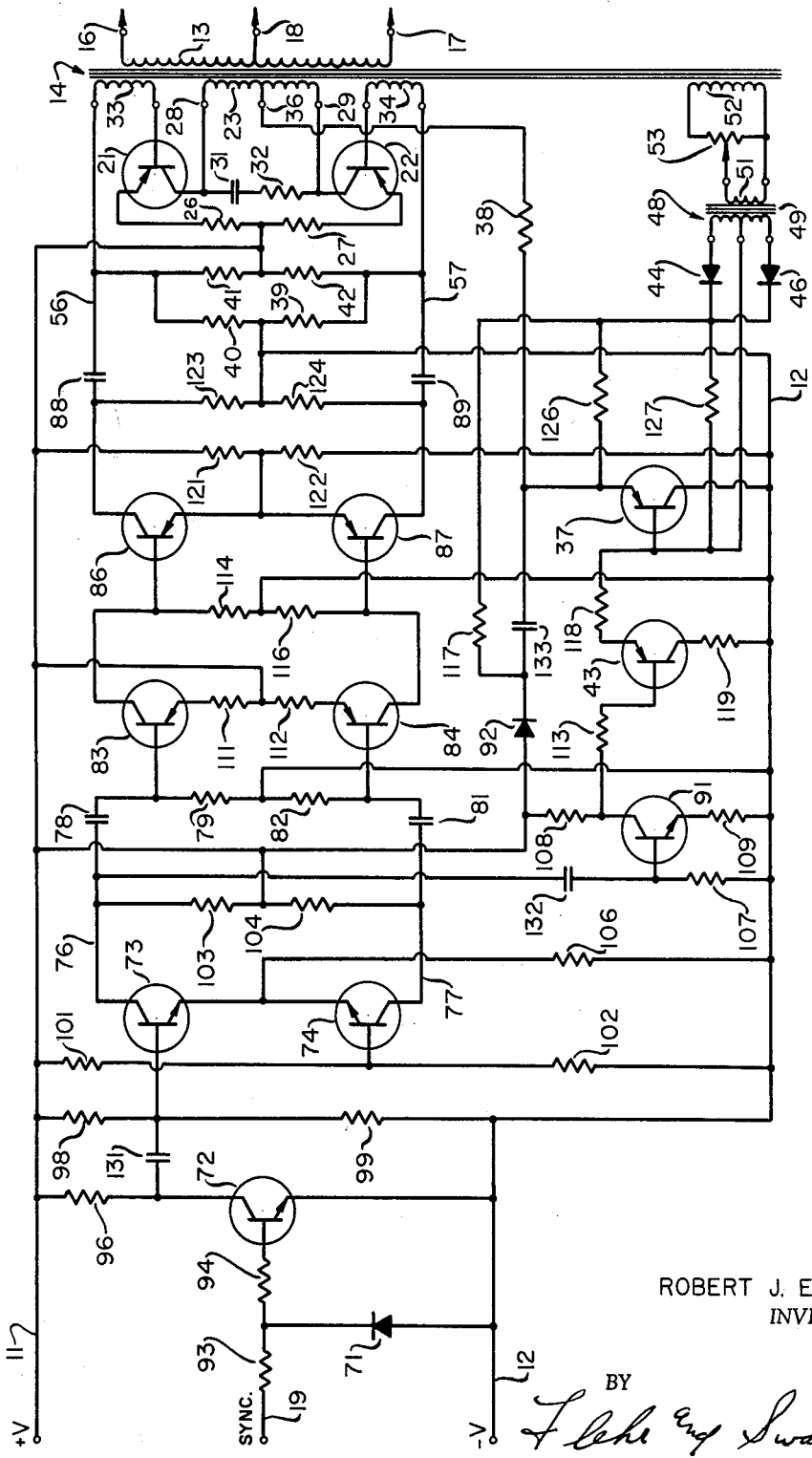

Jan. 22, 1963  R. J. EHRET  3,075,135
INVERTER
Filed Aug. 5, 1959  2 Sheets-Sheet 1

ROBERT J. EHRET
INVENTOR.

BY
ATTORNEYS

ROBERT J. EHRET
*INVENTOR.*

United States Patent Office 3,075,135
Patented Jan. 22, 1963

---

3,075,135
INVERTER
Robert J. Ehret, Los Altos, Calif., assignor to Ampex Corporation, Redwood City, Calif., a corporation of California
Filed Aug. 5, 1959, Ser. No. 831,851
4 Claims. (Cl. 321—18)

This invention relates generally to an inverter and more particularly to a transistorized inverter.

In transistorized inverters it is desirable to operate the transistors as switches whereby they are either turned fully on or fully off. When transistors are operated as switches, the power which they must dissipate is relatively small, for when the transistor is on, the voltage is relatively low, and when the transistor is off the current is relatively low. However, inverters of this type generally provide a squarewave output which is rich in harmonic content. If the output is employed to drive synchronous motors or other machinery, the harmonics do not contribute to useful work but are converted to heat. A further disadvantage with inverters of the prior art is that, in order to obtain regulated output power, the power supply for the inverters must be regulated.

It is a general object of the present invention to provide an improved transistorized inverter.

It is another object of the present invention to provide a transistorized inverter in which the transistors are employed as switches and in which the output wave has a low harmonic content.

It is a further object of the present invention to provide a transistorized inverter which operates from an unregulated D.-C. power and provides regulated output power.

It is still a further object of the present invention to provide a transistorized inverter which employs a saturable core reactor to regulate the output power.

These and other objects of the invention will become more clearly apparent from the following description when taken in conjunction with the accompanying drawing.

Figure 2:
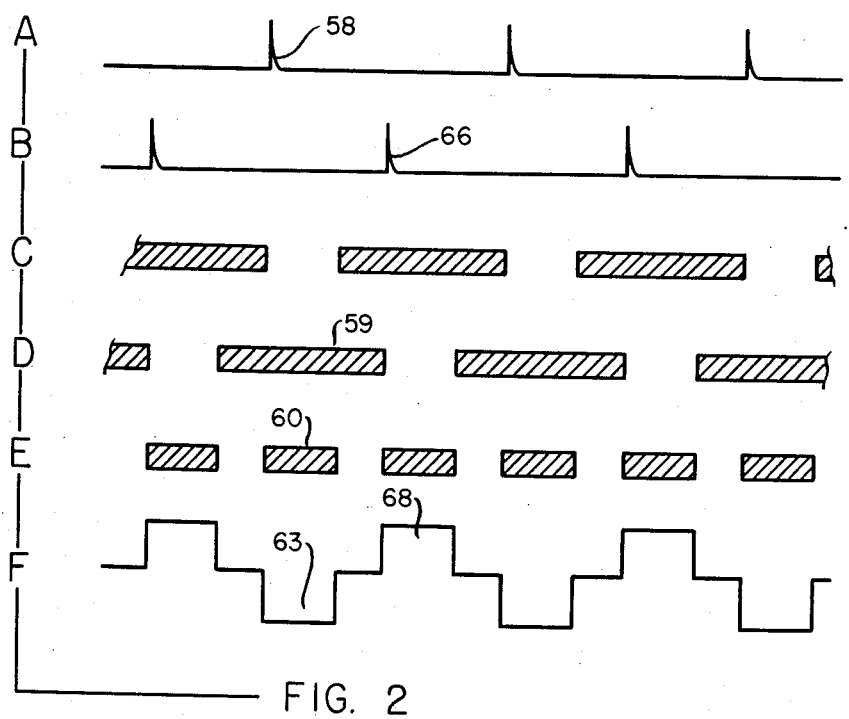

Referring to the drawing:

FIGURE 1 is a circuit diagram of an inverter in accordance with the present invention; and FIGURE 2 shows the waveforms at various points in the circuit of FIGURE 1.

Referring to FIGURE 1, the unregulated D.-C. voltage is applied to the lines 11 and 12 as indicated by the voltage notation $+V$ and $-V$. Alternating current power is available at the output winding 13 of the transformer 14. The output winding 13 includes output terminals 16 and 17 and the center tap terminal 18.

Synchronizing signals control the frequency of the output wave. These signals are applied at the terminal 19 and operated upon to form triggering pulses for application to the switching transistors 21 and 22. The transistors 21 and 22 are connected in circuit with a primary winding 23 of the output transformer 14.

The switching transistors 21 and 22 have their emitter terminals connected to the line 11 through current limiting resistors 26 and 27, respectively. The collectors of the transistors 21 and 22 are connected to the terminals 28 and 29 of the primary 23, respectively. A network including the capacitor 31 and resistor 32 is connected between the collectors of the switching transistors 21 and 22. Triggering pulses are applied to the bases of the transistors 21 and 22 in series with the windings 33 and 34, respectively. The windings 33 and 34 are coupled to the core of the transformer and serve to provide a voltage between the base and emitter of the transistors as will be presently described.

The center tap 36 of the winding 23 is connected to the emitter of a common switching transistor 37 through resistor 38. The collector of the transistor 37 is connected directly to the line 12. The line 12 is connected to the common terminal of the resistors 39 and 40 connected in parallel with the resistors 41 and 42. The base of the transistor 37 is connected to receive switching pulses either from the amplifier including transistor 43 or from the rectifiers 44 and 46.

The rectifiers 44 and 46 are connected as a fullwave rectifier to the secondary winding 48 of a saturable core reactor 49. The primary winding 51 of the saturable core reactor is coupled to the core of the output transformer by the winding 52. A potentiometer 53 serves to provide a predetermined fraction of the voltage induced on winding 52 to the primary winding 51 of the saturable core reactor.

The circuit described thus far serves as the inverter and regulator of the present invention. The remainder of the circuit shown in FIGURE 1 is adapted to receive synchronizing pulses at the terminal 19 and to provide suitable triggering pulses for the transistor switches 21 and 22, as previously described. It will be apparent after the description of the operation of the inverter and regulator that means other than those shown may be employed for supplying triggering pulses to the transistors 21 and 22.

Operation of the inverter and regulator is as follows: In the absence of signal from the transformer 14, the switching transistors 21 and 22 are normally biased "on" by the voltage applied from the resistive divider including resistors 41 and 42. The common transistor 37 is normally biased "off" by the voltage applied from resistors 117 and 127.

Assume that pulses of the type shown in FIGURE 2A are applied to the base of the switching transistor 21 along the line 56 and that pulses of the type shown in FIGURE 2B are applied along the line 57 to the base of the switching transistor 22. Assume further that before the pulses are applied, transistors 21 and 22 are biased "on" and that the transistor 37 is biased "off." When the positive pulse 58, FIGURE 2A, is applied along the line 56, it will start to turn off the transistor 21. As the transistor starts to turn off, a voltage is induced in the windings associated with the core of the transformer. The voltage induced in the winding 34 is such that the transistor 22 is biased "on" more strongly. A voltage is also induced in the winding 52 which is applied through the saturable core reactor 49 and rectifier 44 to the base of the common transistor 37 tending to turn the transistor 37 "on." Thus, a circuit is completed from the line 11 through resistor 27, through emitter to collector path of the transistor 22, through the portion of the primary winding including terminal 29, from the center tap 36 of winding 23, through the resistor 38, through the emitter to collector path of the transistor 37 and to the common line 12. A voltage will appear across the various windings, which voltage tends to more strongly turn "off" the transistor 21, and more strongly turn "on" the transistors 22 and 37. The switching action takes place almost instantaneously because of the coupling arrangement described.

Referring to FIGURE 2, the shaded areas associated with FIGURE 2C represent the "on" condition for the transistor 21; the shaded areas in FIGURE 2D represent the "on" condition for the transistor 22; and the shaded areas, FIGURE 2E, represent the "on" condition for the transistor 37. The condition just described corresponds to the shaded areas 59 and 60.

The saturable core reactor will saturate after predetermined volt-seconds have been applied. When the reactor saturates, there is no longer any change in flux. The induced voltage in the winding 48 drops to zero, and thus the voltage applied to the rectifiers 44 and 46 will drop to zero and the transistor 37 will be biased "off." The induced voltage in winding 33 is reduced to zero and the transistor 21 is biased "on." Thus, the transistors 21 and 22 are "on," and the transistor 37 is "off." There is provided a closed path through the collector-emitter junction of the transistors 21 and 22 connecting the terminals 28 and 29 as the primary of the winding 23. Flux in the transformer 14 tends to maintain itself and spikes in the output winding due to collapse of fields are minimized. The output voltage is the type shown at 63 in which the area under the curve has a constant value.

The next switching pulse 66 switches "off" the transistor 22. This gives rise to a similar chain of effects, more strongly turning "on" the transistors 21 and 37 and turning "off" transistor 22. An output wave of the type shown at 68 results. Here again, when the core of saturable core reactor 49 saturates, the transistor 37 is switched "off" and the transistors 21 and 22 are both switched "on" to prevent the collapse of the flux in the field.

The output wave available at the terminals 16 and 17 has a frequency dependent upon the frequency of the pulses 58 and 66 and a waveshape which is dependent upon the setting of the potentiometer 53. By appropriately selecting the position of the potentiometer 53, an output waveform, FIGURE 2F, is created for which the Fourier analysis will show a minimum of third harmonics. Thus, filters and the like can be eliminated, if desired, without overheating of associated equipment due to third harmonic voltages.

Referring to FIGURE 1, the remainder of the circuit shows means for generating the triggering pulses 58 and 66 from a sync signal applied at 19. The sync pulse applied at the terminal 19 is limited by the diode 71 and applied to the base of the transistor 72 which is connected in an amplifying circuit. The amplified output from the transistor 72 is applied to the phase splitter including the transistors 73 and 74 which provide output waves, having a 180° phase relationship, at the lines 76 and 77. These waves are applied to the combination of capacitor 78 and resistor 79, and capacitor 81 and resistor 82, respectively, and then applied to the bases of the transistors 83 and 84 which are connected in an amplifying circuit. The signal is further amplified by the circuit including transistors 86 and 87 and then applied through the capacitors 88 and 89 to the base of the switching transistors 21 and 22.

In order to initially start the inverter, a triggering pulse is required for the transistor 37. Such a pulse may be obtained from the line 76 and coupled to the base of the amplifying transistor 91. The output of the transistor 91 is amplified by the transistor 43 and applied to the base of the switching transistor 37. Thus, the transistor 37 is switched by each of the pulses derived at the line 76 to thereby maintain the same in synchronism with the incoming synchronizing pulses.

An inverter in accordance with FIGURE 1 was constructed in which the various components had the following values.

Voltages:
+V _____ volts__ +24
−V _____ do____ −24

Transistors:
21 _____ 2N174
22 _____ 2N174
37 _____ 2N174
43 _____ 2N383
72 _____ 2N167
73 _____ 2N167
74 _____ 2N167
83 _____ 2N383
84 _____ 2N383
86 _____ 2N268

Transistors:—Cont.
87 _____ 2N268
91 _____ 2N167

Diodes:
44 _____ 10N1
46 _____ 10N1
71 _____ 1N200
92 _____ 10N1

Resistors:
26 _____ ohms__ 0.1
27 _____ do____ 0.1
32 _____ do____ 22
38 _____ do____ 0.1
39 _____ do____ 50
40 _____ do____ 50
41 _____ do____ 5
42 _____ do____ 5
53 _____ do____ 25
79 _____ do____ 22K
82 _____ do____ 22K
93 _____ do____ 1K
94 _____ do____ 1K
96 _____ do____ 4.7K
98 _____ do____ 22K
99 _____ do____ 4.7K
101 _____ do____ 22K
102 _____ do____ 3.3K
103 _____ do____ 1.5K
104 _____ do____ 2.2K
106 _____ do____ 220
107 _____ do____ 4.7K
108 _____ do____ 4.7K
109 _____ do____ 4.7K
111 _____ do____ 1
112 _____ do____ 1
113 _____ do____ 4.7K
114 _____ do____ 680
116 _____ do____ 680
117 _____ do____ 100
118 _____ do____ 220
119 _____ do____ 10
121 _____ do____ 2.5
122 _____ do____ 2.5
123 _____ do____ 75
124 _____ do____ 75
126 _____ do____ 5
127 _____ do____ 15

Capacitors:
31 _____ mf__ 1
78 _____ mf__ .1
81 _____ mf__ .1
88 _____ mf__ 15
89 _____ mf__ 15
131 _____ mf__ .47
132 _____ mf__ .02
133 _____ mf__ 15

Transformer turns:
13 _____ 404
23 _____ 120
33 _____ 10T
34 _____ 10T
48 _____ 418T
51 _____ 436
52 _____ 42T Transformer core—Magnetics 50026–2A.

Synchronizing pulses having a frequency of 62 c.p.s. were applied to the inverter.

The resistor 53 was adjusted and the harmonic content of the output wave was 1% 3RD. The input voltage was varied between 15 v. and 30 v., and the output power varied only 4%.

Thus, it is seen that an inverter which is adapted to provide constant output power from an unregulated D.-C. supply is provided. The circuit is such that the harmonic content of the output wave is satisfactory for operating motors and the like. The transistors employed with the output circuit are operated as switches whereby they are required to have minimum power dissipation capabilities.

I claim:

1. An inverter including first and second input lines coupled to a source of direct current, a transformer having a core and at least a center tapped primary winding and a secondary winding, said secondary winding adapted to supply power to an associated alternating current load, a pair of switching transistors serving to selectively connect the first line to opposite terminals of the primary winding in response to switching signals, a common switching transistor connected between the center tap of said primary winding and said other line, a saturable core reactor, means for coupling the input of said saturable core reactor to the flux variations in the core of said transformer, said common switching transistor being connected to be switched by the output of said saturable core reactor.

2. An inverter including first and second input lines coupled to a source of direct current, a transformer having a core and at least primary and secondary windings, a pair of switching transistors coupled between the primary winding and said first line, a source of synchronizing pulses coupled to the pair of transistors for alternately conditioning the transistors for conduction, a common switching transistor coupled between a center tap of the primary winding and the second line, and means coupled to the transformer core and to the common switching transistor for selectively completing a current path between the first and second lines through the primary winding, whereby an alternating output is induced in the secondary winding.

3. An inverter comprising first and second lines coupled to a source of direct current, a transformer having a core and at least primary and secondary windings with the primary winding having first and second terminals and a center tap, first and second switching transistors respectively coupled between the first and second terminals and the first line, means for applying switching pulses to the first and second transistors, a third switching transistor coupled between the center tap and the second line, and means including a saturable core transformer coupled between the transformer core and the third switching transistor for controlling current flow between the first and second lines through the primary winding whereby an alternating output is induced in the secondary winding.

4. An inverter comprising first and second lines coupled to a source of direct current, a transformer having a core, a primary winding including first and second terminals and a center tap, first and second transistors each having base, emitter, and collector electrodes with the collector of the first transistor connected to the first terminal and the collector of the second transistor connected to the second terminal, means coupled to the base of each of the first and second transistors for applying separate switching signals at spaced intervals, a first secondary winding of the transformer coupled between base and emitter of the first transistor for providing bias, a secondary winding of the transformer coupled between base and emitter of the second transistor for providing bias, the first line being coupled to the emitter of both the first and second transistors, a third transistor having base, emitter, and collector electrodes with the emitter-collector current path connected between the center tap and the second line, a third secondary winding of the transformer coupled to drive a saturable reactor with the output of the reactor coupled between the base and emitter electrodes of the third transistor to switch the transistor between conduction and nonconduction, and an output winding of the transformer having terminals providing an alternating current output controlled by switching pulses and the saturable reactor.

References Cited in the file of this patent
UNITED STATES PATENTS

| | | |
|---|---|---|
| 2,959,745 | Grieg | Nov. 8, 1960 |
| 2,968,738 | Pintell | Jan. 17, 1961 |
| 2,968,739 | Mohler | Jan. 17, 1961 |

OTHER REFERENCES

"Transistor Power Convertors," by Bill Hamlin CQ (May 1958), pp. 42 and 43 relied on. Copy in Scientific Library and Div. 48.